Figure 1:
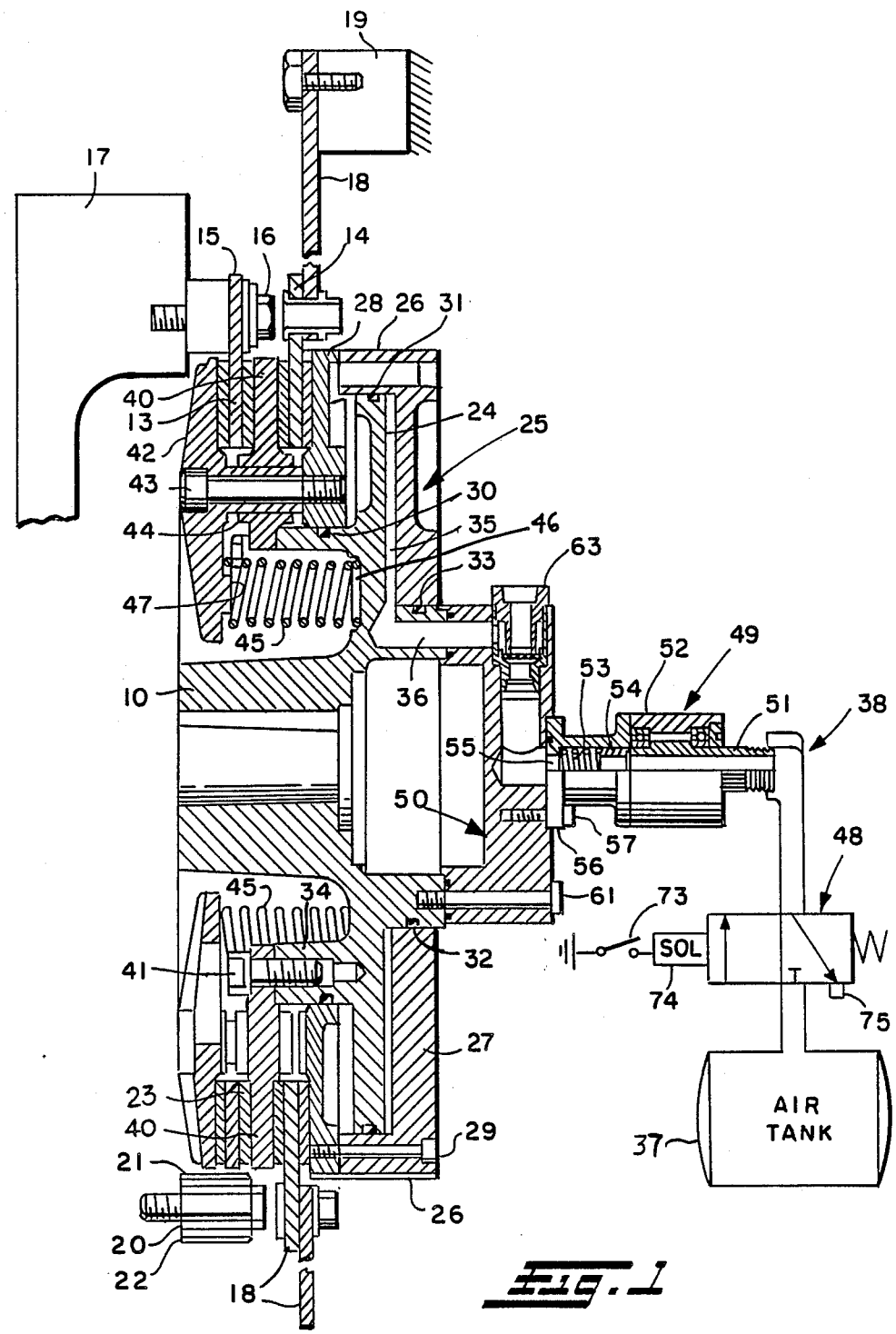

United States Patent [19]

Collins et al.

[11] Patent Number: 4,874,068
[45] Date of Patent: Oct. 17, 1989

[54] CLUTCH AND BRAKE RAPID EXHAUST MANIFOLD

[75] Inventors: Marcus H. Collins, Akron; Ronald W. Diesch, Lodi, both of Ohio

[73] Assignee: Eaton Corporation, Cleveland, Ohio

[21] Appl. No.: 145,154

[22] Filed: Jan. 19, 1988

[51] Int. Cl.⁴ .............................................. F16D 67/04
[52] U.S. Cl. ............................. 192/18 A; 192/85 AA
[58] Field of Search ................ 192/18 A, 12 C, 85 A, 192/85 AA

[56] References Cited

U.S. PATENT DOCUMENTS

| | | | |
|---|---|---|---|
| 2,747,714 | 5/1956 | Eason | 192/18 A |
| 2,909,256 | 10/1959 | Chung | 192/85 AA |
| 2,942,708 | 6/1960 | Eason | 192/18 A |
| 3,174,378 | 3/1965 | Friedland et al. | 192/18 A |
| 3,469,664 | 9/1969 | Ortlinghaus et al. | 192/18 A |
| 3,727,731 | 4/1973 | Selig | 192/18 A |

FOREIGN PATENT DOCUMENTS

| | | | |
|---|---|---|---|
| 873987 | 7/1942 | France | 192/85 AA |
| 960051 | 6/1964 | United Kingdom | 192/18 A |
| 1602850 | 11/1981 | United Kingdom . | |

*Primary Examiner*—Rodney H. Bonck
*Assistant Examiner*—Richard M. Lorence
*Attorney, Agent, or Firm*—M. L. Union

[57] ABSTRACT

A clutch and brake assembly which includes a spring applied brake and a fluid applied clutch which is adapted to rapidly cycle. A fluid circuit is provided for rapidly pressurizing and rapidly depressurizing the apparatus. The fluid circuit includes a manifold having a main fluid passageway and a plurality of secondary fluid passageways disposed therein. Each of the secondary fluid passageways includes a quick release exhaust valve which is operable to rapidly exhaust fluid from the apparatus to allow the brake to rapidly engage when the fluid pressure in the main fluid passage way and secondary passageway decreases to less than the fluid pressure in the pressure chamber.

6 Claims, 2 Drawing Sheets

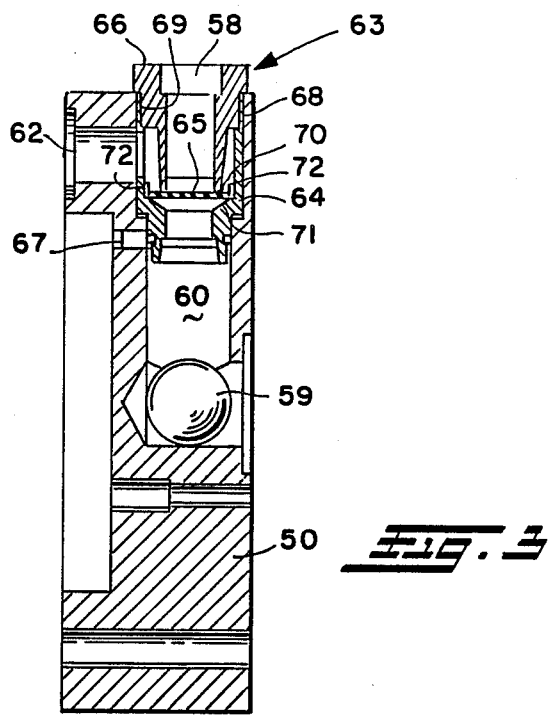
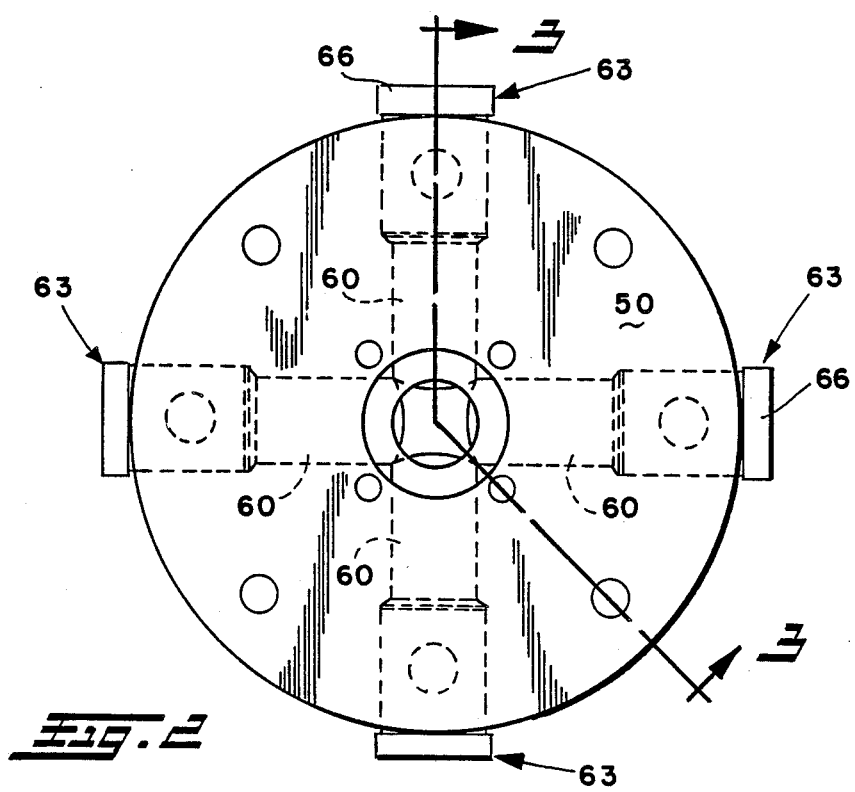

CLUTCH AND BRAKE RAPID EXHAUST MANIFOLD

This invention relates to a clutch and brake assembly for coupling a machine input shaft alternately to a clutch disc or brake disc to apply driving torque and braking torque to the input shaft of the machine. The machine may be a press, a can forming machine, or the like, in which the input shaft is driven by an air actuating clutch disc and braked by a spring applied brake disc, as shown in U.S. Pat. Nos. 3,469,664, 3,727,731 and U.S. patent application Ser. No. 095,195, filed Sept. 11, 1987, now U.S. Pat. No. 4,807,731 owned by Eaton Corporation the assignee of this application. More particularly this invention relates to a clutch and brake assembly as aforementioned having an annular Piston which when pressurized moves axially to engage a clutch disc and when depressurized enables a brake disc to be spring applied.

Clutch and brake assemblies of the above prior art operate satisfactorily at or below a machine duty cycle of approximately 250 cycles per minute. However, presses, and particularly can forming machines, are now required to operate as high as 300 to 400 cycles or cans per minute. It is found that the clutch and brake assemblies for can making machines operating at these higher speeds must be braked extremely fast to avoid damage to the can forming die which necessitates exhausting air pressure from the clutch actuating piston faster than has heretofore been done. In the past, air has been exhausted from the clutch actuating piston by a connecting rotary union or seal via several long hoses to inlets to the piston/cylinder chamber with a quick release or dump valve connecting each hose to each inlet. The length of these hoses and the volume of air therein which must be dumped before the quick release valves can actuate, results in longer piston exhaust time, exceeding the duty cycle of approximately 250 cans per minute.

It is an object of this invention to enable clutch and brake assemblies of the prior art to operate at very high duty cycles, approaching 400 cycles per minute, by providing an air circuit for actuating the clutch and for rapidly exhausting the piston for actuating the clutch.

Another object of the invention is to provide a clutch and brake assembly of the above tyPe in which exhaust valves are disposed in radially extending passages in a manifold enabling the air to be rapidly exhausted from the clutch actuating piston.

The invention is illustrated in the accompanying drawings, in which

FIG. 1 is a longitudinal sectional view showing the clutch and brake apparatus and the actuating circuit according to this invention;

FIG. 2. is an enlarged plan view of the manifold shown in FIG. 1, and;

FIG. 3 is a sectional view taken along the lines 3—3 of FIG. 2.

The clutch and brake assembly of this invention comprises a hub 10 which is keyed, or otherwise fixed, to the input shaft of a machine (not shown), typically, a can forming press, punching machine or the like operating at high speed or duty cycles. The assembly is subjected to torque reversals via the machine input shaft up to several hundred cycles per minute.

The clutch disc 13 has extensions 15 secured by bolts 16 to a driving member 17 which is a flywheel in typical applications. The brake disc 14 has reaction arm 18 connected to the frame 19 of the machine. Preferably, the bolts 16 have an inner and outer bushings 20 and 21 with an intermediate rubber bushing 22 which cushions or absorbs vibrations and noise. The clutch and brake discs may move axially a limited distance since a small clearness exists between the outer bushing 21 and the holes in the extensions 15 and arms 18. Both faces of each of the discs 13 and 14 have a disc 23 made of friction material which is riveted or otherwise secured to the faces of the discs 13 and 14.

The hub 10 is provided with an integrally formed fixed piston 24 extending radially from the hub which coacts with an annular axially movable cylinder, generally referred to by the numeral 25. The cylinder 25 is formed by an outer cylindrical portion 26, an annular radially extending portion 27 and a annular brake plate 28. Portion 26 is secured to the brake plate 28 by a plurality of bolts 29 extending through the portion 26. The piston 24 is provided with three annular seals 30, 31 and 32. The seals 30 and 32 respectively seals the I.D. of the brake plate 28 and the portion 27 of the cylinder 25 and the O.D. of the axially extending annular piston flanges 33 and 34. The seal 31 seals the I.D. of the cylinder portion 26 and the O.D. of the piston 24. Thus, a pressure chamber 35 is formed by the cylinder portion 27 and the piston 24. Passageway 36 is provided in the portion 27 of the cylinder, connected to a source of pressurized fluid 37 by a fluid circuit, generally referred to by numeral 38, for pressurizing the chamber 35.

A rotor 40 which may be ventilated is fixed to the piston flange 34 by a plurality of bolts 41 extending through holes in the radial inner portion so that the rotor 40 is spaced from brake plate 28 and is interposed between the clutch disc 15 and the brake disc 14. Since the piston 24 is fixed to the hub and the rotor 40 is fixed to the piston, the rotor 40, piston 24, and hub 10 rotate together as a unit but do not move axially.

An annular clutch plate 42 is secured to the brake plate 28 by bolts 43 extending through spacer tubes 44 which spaces the clutch plate, a predetermined distance from the brake plate 28 for engagement with the clutch disc 15. The clutch plate 42, brake plate 28 and the cylinder 25, move axially as a unit. A plurality of coil springs 45 are mounted between the clutch plate 42 and the piston 24. One end of each spring 45 is positioned in a depression 46 in the piston and the other end is positioned over a circular projection 47 formed on the face of the clutch plate to hold the springs in position.

The clutch and brake assembly operates to couple the machine shaft (not shown) to the driving member 17 when fluid pressure in the chamber 35 exceeds the pressure of the springs 45 and urges the clutch plate 42 to the right, as viewed in the drawing, toward the clutch disc to engage the friction discs 23, secured to the clutch disc, with the clutch plate 42 and the rotor 40. At the same time, the brake plate 28 moves to the right and is disengaged from the friction disc secured to the brake disc 14. The assembly acts in its braking mode when chamber 35 is depressurized.

The fluid circuit 38 which connects the air tank, or other source of pressurized fluid 37, to the passageway 36 comprises a solenoid operated valve 48, a rotary seal 49, and an annular manifold 50 all connected in series as shown in FIG. 1. The rotary seal 49 is of any conventional construction having a non-rotational inner tubular member 51 and a rotatable member 52 mounted for rotation on the member 51. A spring 53 urges an annular seal 54 against an end of the member 51. Thus, pressurized air is conducted from the air tank 37 and the fixed portion of the air circuit 38 to the outlet 55 of the rotary seal 49.

The flange 56 of member 52 is fastened by bolts 57 in sealing relationship to the manifold 50 so that the center lines of the manifold and the rotary seal coincide. The outlet 55 of the rotary seal 49 communicates with a main central passageway 59 of the manifold which communicates with a plurality of secondary passageways 60 extending radially of the manifold as shown in FIG. 2. The manifold 50 is secured to the hub 10 by the bolts 61 so that each outlet passage 62 communicates with a passageway 36 communicating with the pressure chamber 35.

As seen in FIG. 2, a quick release valve 63 is interposed between each radial passageway 60 and outlet passage 62. The quick release valves 63 may be of any suitable construction which functions to permit pressurized air to flow from radial passageway 60 through the valve 63 and hence to the outlet passage 62 to pressurize the pressure chamber 35, as well as to permit air from the pressure chamber 35 to exhaust to atmosphere via an orifice 58 when the air in the passageway 60 drops below the pressure in outlet passage 62. Preferably, each valve 63 comprises a tubular valve body 64, an elastomeric disc-shaped diaphragm 65 and a tubular end plug 66. The valve body 64 is secured by a set screw 67 in the enlarged radially outer portion 68 of the passageway 60. The external surfaces of the valve body 64 are bonded and sealed to the enlarged portion 68 by a suitable sealing compound such as LOCTITE sealant. The tubular end plug 66 is secured to the body 64 by threads 69 at one end thereof and has an annular sealing face 70 at the opposite end thereof normally in contact with one side of the diaphragm 65. The diameter of the sealing face 70 is substantially less than the diameter of the diaphragm 65. The periphery of the other side of the diaphragm bears against an annular valve seat 71 formed by a ledge in the inner wall of the valve body 64. A plurality of spaced axially extending grooves 72 are formed adjacent the periphery of the diaphragm 65 forming passages so that pressurized air can bypass the diaphragm when the diaphragm moves off of the valve seat 71.

In the position shown in FIG. 1 of the drawings, the solenoid 74 of solenoid valve 48 would be deenergized, the pressure chamber 35 would be depressurized, and the springs 45 would press the brake plate 28 against the friction discs 23 of the brake disc 14 to thus stop rotation of the piston 24, cylinder 25, and hub 10. Braking and stopping of the hub 10 is transmitted to the shaft (not shown) surrounded by the hub so that the shaft to the machine is braked to a standstill. The switch 73 is then closed to energized the solenoid 74 of solenoid valve 48 to shift the valve 48 so that compressed air may enter the air circuit 38, pass through the rotary seal 49, enter the axial passage 59, and the radial passage 60 of the manifold 50. The pressurized air is sufficient to lift the peripheral edge of the diaphragm 65 off of the valve seat 71 so that air may bypass the valve through the bypass grooves 72 and hence pass into the outlet passage 62 to the pressure chamber 35. When the pressure chamber 35 is pressurized the cylinder 25 is moved to the right of the drawing to compress the ring springs 45 to disconnect the brake and connect the clutch disc 13 so that the hub 10 is then coupled to the driving member 17. When the switch 73 is again opened, the solenoid 74 is deenergized and the valve 48 is shifted to the position shown in FIG. 1 permitting air in the air circuit to exhaust through the exhaust orifice 75. As soon as the pressure in the air circuit upstream from the diaphragm 65 is lowered a small amount, the diaphragm unseals from the sealing face 70 and seals the valve seat 71 so that air is exhausted to atmosphere through the orifice 58 in the plug 66 of the release valve 63. Thus, the pressure chamber is depressurized in a minimum time permitted a machine driven by the hub 10 to operate at very high duty cycles, approaching 400 cycles per minute.

We claim:

1. A spring operated brake and fluid operated clutch apparatus having, a hub rotatable with a driven shaft;

an annular piston and cylinder means rotatable with said hub and forming a pressure chamber;

a rotor and means mounting said rotor for rotation with said hub;

a drivable rotatable clutch disc and a non-rotatable brake disc, said rotor disposed between said clutch disc and brake disc;

friction means disposed on opposite faces of said clutch disc and brake disc;

means attached to the outer periphery of said clutch disc connecting said clutch disc to a rotatable driving member;

means attached to the outer periphery of said brake disc connecting said brake disc to a fixed part;

an annular clutch plate and brake plate, support means for supporting said clutch plate axially spaced from said brake plate; said clutch disc, rotor and brake disc positioned between said clutch plate and brake plate;

spring means biasing said brake disc and said rotor toward each other, thereby applying a braking torque to the driven shaft;

a fluid circuit directing fluid between a source of pressurized fluid, said pressure chamber and the atmosphere, said fluid circuit comprising a manifold member having a centrally located main fluid passageway therein and a plurality of second fluid passageways therein each of which communicates at one end thereof with said main fluid passageway and at the opposite end thereof with said pressure chamber, a plurality of quick release valves each of which is disposed in one of said plurality of second passageways in said manifold member and each of which includes an exhaust passageway therein for directing fluid from said pressure chamber to the atmosphere, said main fluid passageway being in fluid communication with said source of pressurized fluid and valve means for disconnecting said source of pressurized fluid from said main fluid passageway and simultaneously exhausting the pressurized fluid in said main fluid passageway to the atmosphere, each of said plurality of quick release valves being disposed an equal distance from said centrally located main fluid passageway and each of said exhaust passageways in each of said quick release valves being disposed in equal distance from said pressure chamber and exhausting pressurized fluid from said pressure chamber when the pressure in said second passageway is decreased to less than the pressure in said pressure chamber.

2. A brake and clutch apparatus as claimed in claim 1 in which each quick release valve is mounted radially outwardly of said main fluid passageway.

3. A brake and clutch apparatus as claimed in claim 1 in which each of said second passageways extend radially of said manifold.

4. A spring operated brake and fluid operated clutch apparatus comprising;
- a hub adapted to be rotatable with a driven input shaft;
- a piston and cylinder means rotatable with said hub and forming a pressure chamber;
- a rotor connected to said hub for rotation therewith;
- a rotatable clutch disc connectable to a rotatable output member;
- a non-rotatable brake disc;
- spring means biasing said brake disc and said rotor toward each other and said clutch disc and said rotor away from each other;
- said pressure chamber adapted to be connected to a source of pressurized fluid, said pressure chamber when pressurized operatively connecting said rotor and said clutch disc against the bias of said spring means and disconnecting said rotor and said brake disc, said spring means operatively connecting said rotor and said brake disc and disconnecting said rotor and said clutch disc when said pressurized chamber is depressurized;
- a fluid circuit for directing fluid between the source of pressurized fluid, said pressure chamber and the atmosphere, said fluid circuit comprising a manifold member having a centrally located main fluid passageway therein and a plurality of second passageways, each of which communicates at one end thereof with said main fluid passageway and at the opposite end thereof with said pressure chamber, a plurality of quick release valves, each of which is disposed in one of said plurality of second passageways and each of which includes an exhaust passageway therein for directing fluid from said pressure chamber, said main fluid passageway being in fluid communication with the source of pressurized fluid and valve means for disconnecting said source of pressurized fluid from said main fluid passageway and simultaneously exhausting the pressurized fluid in said main fluid passageway.

5. A spring operated brake and fluid operating clutch apparatus as defined in claim 4 wherein each of said plurality of quick release valves is disposed an equal distance from said centrally located main passageway and each of said exhaust passageways in each of said quick release valves is disposed an equal distance from said pressure chamber, each of said quick release valves exhausting pressurized fluid from said pressure chamber when the pressure in said second passageway is decreased to less than the pressure in said pressure chamber.

6. A spring operated brake and fluid operating clutch as defined in claim 4 wherein each of said quick release valves is disposed adjacent to said pressure chamber and said valve means for disconnecting said source of pressurized fluid from said main fluid passageway is disposed adjacent to said main fluid passageway.

* * * * *